United States Patent
Schroeder, Jr.

[11] 4,046,298
[45] Sept. 6, 1977

[54] METHODS AND APPARATUS FOR STRIPPING OPTICAL FIBER RIBBONS

[75] Inventor: Charles Martin Schroeder, Jr., Hamilton Township, Mercer County, N.J.

[73] Assignee: Western Electric Company, Inc., New York, N.Y.

[21] Appl. No.: 645,145

[22] Filed: Dec. 29, 1975

[51] Int. Cl.² .............................................. B26F 3/00
[52] U.S. Cl. ......................................... 225/2; 81/9.51; 156/344; 225/94; 225/96.5; 350/96 R
[58] Field of Search ...................... 156/250, 344, 584; 81/9.5 R, 9.5 C, 9.51; 83/4; 225/2, 94, 96.5

[56] References Cited

U.S. PATENT DOCUMENTS

| | | | |
|---|---|---|---|
| 2,743,632 | 5/1956 | Ames | 81/9.51 |
| 3,261,239 | 7/1966 | Moons et al. | 81/9.51 |
| 3,385,140 | 5/1968 | Carpenter et al. | 81/9.51 |
| 3,820,420 | 6/1974 | Matthews | 81/9.5 R |
| 3,851,425 | 12/1974 | Lang | 81/9.51 |
| 3,871,935 | 3/1975 | Gloge et al. | 156/158 |
| 4,017,013 | 4/1977 | Hawk | 225/96.5 |

OTHER PUBLICATIONS

Bisbee, D. L. and Smith, P. W., "All-Glass Optical-Fiber Tapes," The Bell System Technical Journal, vol. 54, No. 3, Mar. 1975, pp. 479-484.
Chinnock, E. L., et al., "Preparation of Optical-Fiber Ends of Low-Loss Tape Splices," The Bell System Technical Journal, vol. 54, No. 3, Mar. 1975, pp. 471-477.
Gloge, D. et al., "Optical Fiber End Preparation for Low-Loss Splices," The Bell System Technical Journal, vol. 52, No. 9, Nov. 1973, pp. 1579-1588.
Smith, P. W. et al., "A Molded-Plastic Technique for Connecting and Splicing Optical Fiber Tapes and Cables," The Bell System Technical Journal, vol. 54, No. 6, July-Aug. 1975, pp. 971-984.

*Primary Examiner*—Douglas J. Drummond
*Assistant Examiner*—John E. Kittle
*Attorney, Agent, or Firm*—D. J. Kirk

[57] ABSTRACT

This disclosure relates to a method and apparatus for stripping a protective coating from multi-conductor flat ribbon containing a plurality of parallel, spaced optical fibers. The ribbon is clamped to the periphery of a rotatable cylindrical stripping wheel and a cutting blade is brought into contact with, and cuts into, a portion of the protective coating. The stripping wheel is rotated to cut the protective coating while simultaneously optimally bending the fibers preparatory to subsequent fiber breaking operation.

An alternative embodiment is directed to shaving a small section of the protective coating and capturing that section in a clamp. The clamp is moved away from the ribbon to peel a portion of the protective coating therefrom as the cylinder is simultaneously rotated to optimally bend the fibers preparatory to the fiber breaking operation.

4 Claims, 10 Drawing Figures

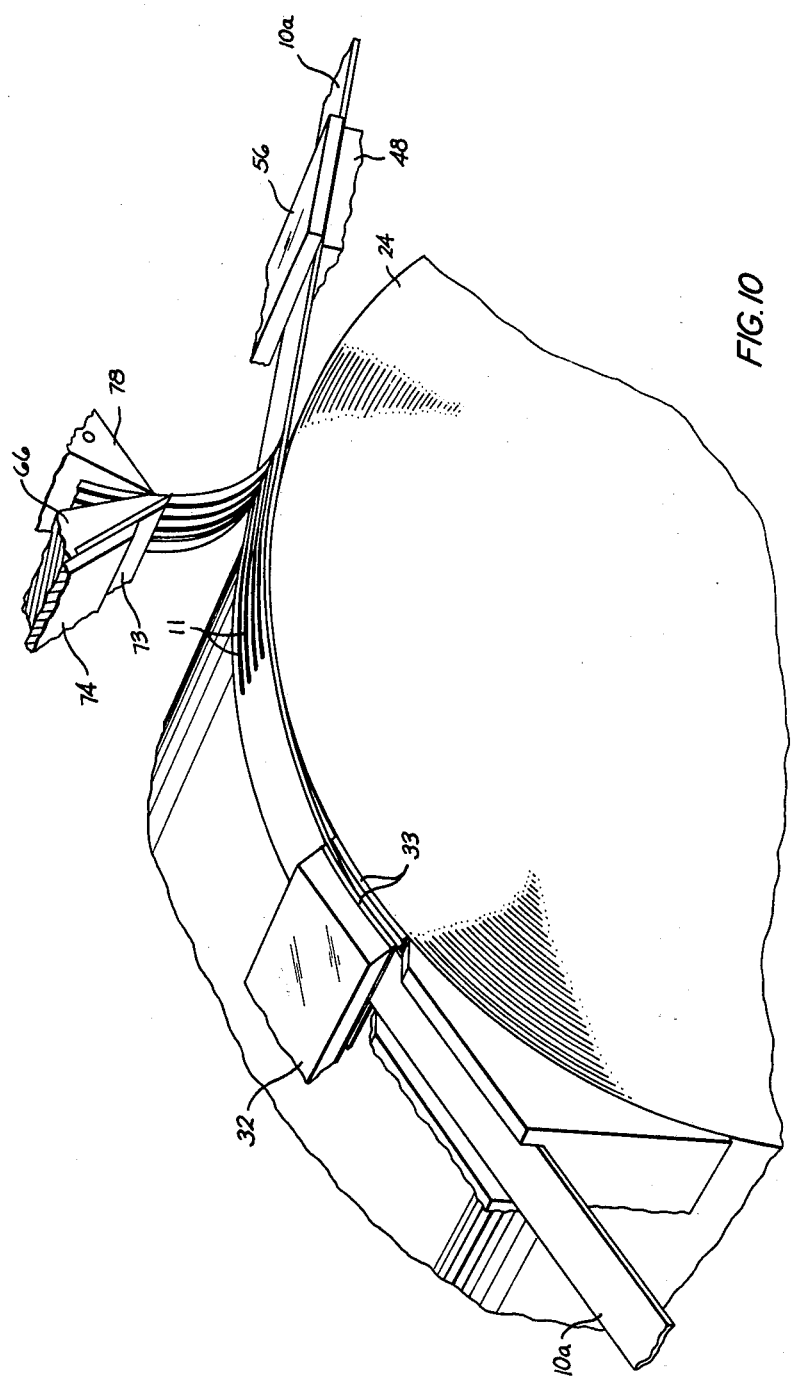

METHODS AND APPARATUS FOR STRIPPING OPTICAL FIBER RIBBONS

BACKGROUND OF THE INVENTION

1. Field of the Invention

This invention relates to methods and apparatus for stripping a protective coating from multi-conductor flat cables. More particularly, the invention is directed to the removing of portions of the protective coating from multi-conductor flat ribbons containing a plurality of optical fibers.

2. DESCRIPTION OF THE PRIOR ART

The present invention is particularly applicable to, and is most readily understood in the context of, stripping flat cables containing glass optical fibers. However, the invention is not so limited, as the instant concepts are applicable to the stripping of any mutli-conductor cable having brittle rods or fibers as the conductor material.

Transmission of information over optical fiber cable is well known. Additionally, it is known that such cables may be formed in a planar array wherein a plurality of parallel optical fibers are encapsulated or bonded within a protective coating in a planar multi-conductor ribbon. Such a planar array appears to be one of the more efficient ways of arranging such ribbons. However, problems arise when the ribbons are to be spliced to another ribbon or terminated at a connector.

In order to terminate or splice such ribbons by butt joining the ends of the glass optical fibers, it is critical that the fiber ends be optically smooth and perpendicular to the axes of the fibers. A method of breaking optical fibers so as to produce such ends is described in an article in the Bell System Technical Journal, entitled, "Optical Fiber End Preparation for Low-Loss Splices," by D. C. Gloge et al., Vol. 52, No. 9, November 1973. This method requires that the fiber be simultaneously bent and put under longitudinal tension, then scored by a sharp blade which causes the fiber to break, or fracture, in a plane perpendicular to the longitudinal axis of the fiber with a smooth, flat surface.

To implement the foregoing fiber breaking method, a section of the protective coating about the fiber was manually removed using a hand-held razor blade or knife. Care had to be taken not to nick or scratch the optical fiber while being careful that a sufficient length of the fiber was exposed for the subsequent scoring step. Once the protective coating was removed, the exposed portion of the fiber was placed over a form having an optimum radius of curvature to ensure the desired cracking. Portions of the fiber on each side of the stripped section were then clamped and a longitudinal force applied to place the fiber in tension as a diamond needle point scored the fiber causing the desired breaking.

Such a procedure incorporating the separate sequential steps of removing the protective coating and then bending the optical fiber prior to scoring and breaking is cumbersome and inefficient.

SUMMARY OF THE INVENTION

The instant invention avoids the foregoing problem with a method that simultaneously removes a portion of the protective coating from an optical fiber ribbon while bending the fibers to a desired radius of curvature preparatory to the scoring and breaking thereof.

In one embodiment, the method comprises the steps of clamping the fiber ribbon to a section of the periphery of a rotatable cylinder, cutting into the protective coating with a cutting tool and then rotating the cylinder to simultaneously remove the portion of the protective coating from the fibers, as the fibers are bent to a predetermined radius of curvature about the periphery of the cylinder.

An apparatus to implement the foregoing method comprises a rotatable cylinder, means for clamping the optical fiber ribbon to the periphery of the rotatable cylinder, means for cutting into the protective coating, and means for rotating the cylinder to strip a portion of the protective coating from the ribbon as the fibers are bent to a predetermined radius of curvature about the periphery of the cylinder.

In a further embodiment, the method comprises the steps of clamping the fiber ribbon to a section of the periphery of a rotatable cylinder, shaving the protective coating to form an upraised, shaved section extending from the protective coating and clamping the shaved section with a first clamp which is spaced from the rotatable cylinder. Then the clamp is moved away from the ribbon while simultaneously rotating the cylinder to peel the portion of the protective coating from the fibers while bending the fibers to a predetermined radius of curvature about the periphery of the cylinder.

The apparatus to implement this method comprises a rotatable cylinder and a cutting tool to shave the protective coating to form an upraised, shaved section extending from the protective coating. A second clamping means is spaced from the rotatable cylinder and clamps the shaved portion therein. A portion of the protective coating is then peeled from the ribbon as the clamp is moved away from the ribbon and the rotatable cylinder simultaneously rotates to bend the ribbon to a predetermined radius of curvature about the periphery of the cylinder.

Advantageously, the foregoing method and apparatus provide an effective technique for removing the protective coating from a flexible ribbon preparatory to breaking the fibers encapsulated therein.

In addition, the fibers are being optimally bent on the curved surface of the cylinder, preparatory to a subsequent breaking operation, as a portion of the protective coating is being removed therefrom.

A further advantage is that a plurality of multi-conductor ribbons may be simultaneously stripped using the instant method and apparatus.

BRIEF DESCRIPTION OF THE DRAWINGS

FIG. 10 depicts an alternate method of peeling an adhesively bonded protective coating from the optical fiber ribbon.

DETAILED DESCRIPTION OF THE INVENTION

Optical glass fibers have been used as optical waveguides to carry information in much the same manner wires or metallic waveguide do. For ease of handling and for protection, multiple fibers are formed in a flat multi-conductor cable or ribbon generally indicated by the numeral 10 in FIG. 5.

Figure 1:
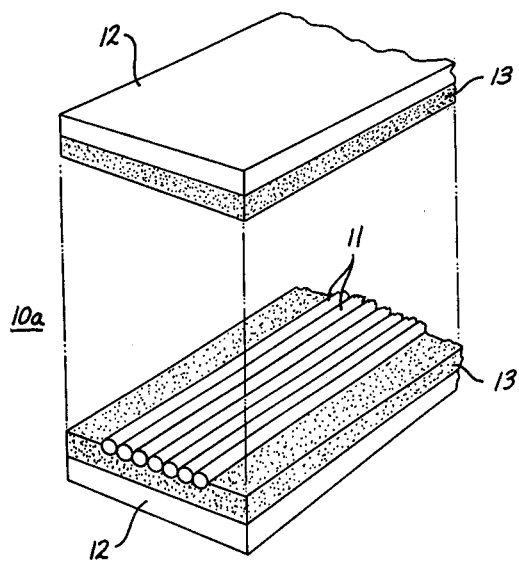
FIG. 1 is an exploded isometric view of an optical fiber ribbon having an adhesively bonded protective coating.
Figure 2:
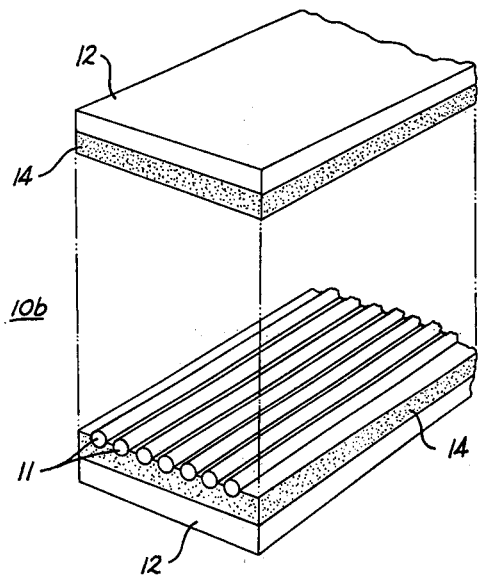
FIG. 2 is an exploded isometric view of an optical fiber ribbon having a laminated protective coating.

Presently, there are two basic multi-conductor ribbon designs, the adhesive 10a and the laminated 10b, which are depicted in FIGS. 1 and 2, respectively.

The adhesive design 10a of FIG. 1 is formed by sandwiching a plurality of parallel optical fibers 11—11 between two protective coatings 12—12 each of which have an adhesive coating 13 thereon. The protective coatings 12—12 are pressed together, without heat, with the optical fibers 11—11 adhesively bonded therebetween.

The laminated design 10b of FIG. 2 is fabricated in a similar manner, except the adhesive coating 13 is replaced with a polyethylene film 14 which requires heat, as well as pressure to form the required bond. The fibers 11—11 are spaced apart to permit the polyethylene films 14—14 to make contact between the fibers to form a secure bond.

The outside diameter of the optical fiber 11 is approximately 100 $\mu$m. The protective coating 12 is approximately 0.0025 cm. thick in the adhesive design 10a of FIG. 1 and 0.0038 cm. thick in the laminated design 10b of FIG. 2. In a particular ribbon 10 which was stripped using the instant inventive concepts, twelve optical fibers 11—11 were encapsulated in a ribbon having a width of 0.4 cm. The protective coating 12 typically comprises polyethylene terepthalate which is a product of E. I. DuPont de Nemours and Company and is sold under the registered trademark "MYLAR," or other similar pliant material having high strength and light weight. The adhesive 13 and the polyethylene film 14 are approximately 0.0038 cm. thick.

The splicing or terminating of such multi-conductor optical fiber ribbon 10 requires that a portion of each fiber 11 be exposed by removing the protective coating 12 without damaging the fibers. Additionally, as indicated in the above-referred to Bell System Technical Journal article, the fiber 11 should be bent, put under tension and scored to cause a controlled fracturing or breaking of the fiber. This controlled breaking technique results in a fiber end that is substantially optically flat and perpendicular to the axis of the fiber 11, which is a requisite to acceptable butt joining or termination of the optical fibers.

Heretofore, the protective coating 12 was stripped from the fiber 11 by using a hand-held knife, razor blade or other sharp instrument. Then, in a separate operation, the fibers 11—11 were put in tension and bent over a stationary curved form, and scored with a diamond stylus to cause the desired controlled breaking.

Figure 3:
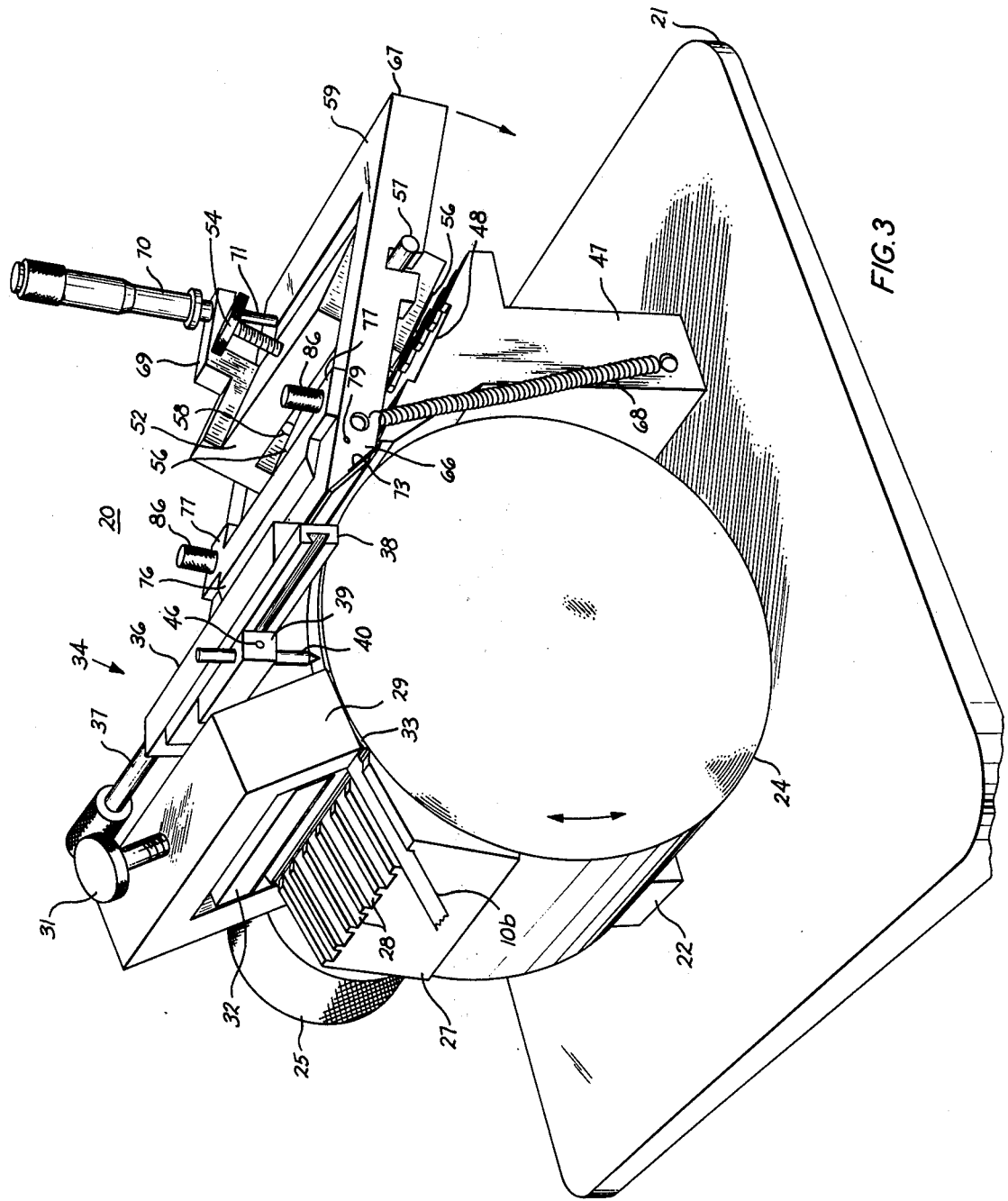
FIG. 3 is an isometric view of the apparatus of the instant invention.

FIG. 3 depicts an exemplary stripping apparatus, indicated generally by the numeral 20, for removing a portion of the protective coating 12 from the multi-conductor ribbon 10. As a portion of the protective coating 12 is being removed, the fibers 11—11 are simultaneously being bent to a predetermined optimum radius of curvature preparatory to subsequent controlled breaking of the fibers which is advantageously accomplished by the same apparatus 20.

Figure 4:
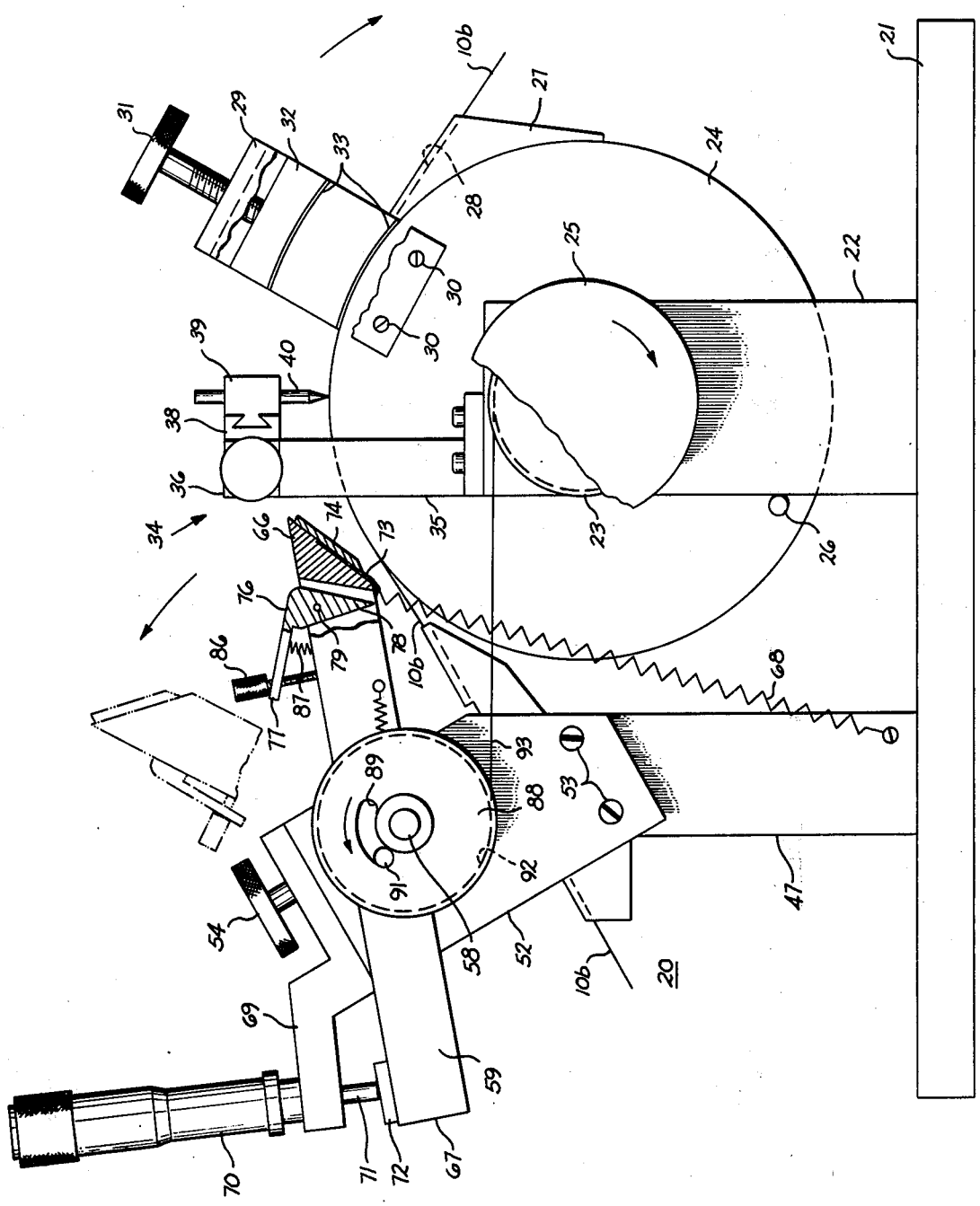
FIG. 4 is a side view of the apparatus of the instant invention.

The apparatus 20 is mounted on a planar base 21) see FIGS. 3 and 4) with a support arm 22 projecting upwardly therefrom. A rotatably mounted shaft 23 extends through the support arm 22 and is fixedly connected to a cylindrical stripping wheel 24. A knob 25 is fixedly attached to the shaft 23, and a permanent stop pin 26 projects horizontally from the side of the stripping wheel 24. A ribbon guide member 27 having a plurality of parallel grooves 28—28 therein is permanently affixed to the periphery of the cylindrical stripping wheel 24. A substantially inverted U-shaped wheel clamp 29 is affixed to the stripping wheel 24 by a plurality of screws 30—30 as can best be seen in FIG. 4. A first screw 31 controls the movement of a first block 32 towards and away from the cylindrical stripping wheel 24. Thin compliant pads 33—33 are bonded to both the block 32 and the stripping wheel 24.

A scoring assembly, generally designated by the numeral 34 is comprised of a support member 35 which is connected to the support arm 22, a guide arm 36 having a rotatable drive shaft 37 extending therein to control the lateral movement of a channel member 38 which provides support for a stylus mounting member 39. A diamond tip stylus 40 extends into and through the mounting member 39 and is held in place by a set screw 46.

A support block 47 having a slanted upper end 48 is also mounted on the planar base 21 in spaced relation to the cylindrical stripping wheel 24. The upper end 48 of the support block 47 has first and second groups of alignment grooves, 49—49 and 51—51, respectively.

An external clamp 52 is fixedly connected to the support block 47 by a pair of screws 53—53 as can best be seen in FIG. 4. A second screw 54 controls the movement of a second block 56 towards and away from the upper end 48 of the support block 47. First and second pivot pins 57 and 58, respectively, project laterally from the sides of the external clamp 52.

A rectangular yoke 59 having first and second ends 66 and 67, respectively, is pivotally mounted about the external clamp 52 on the pivot pins 57 and 58. A pair of biasing springs 68—68 are connected from the support block 47 to the first end 66 of the yoke 59 to bias the first end of the yoke towards the surface of the cylindrical stripping wheel 24. a cantilevered support arm 69 is mounted on the external clamp 52 and extends over the second end 67 of the rectangular yoke 59. A micrometer adjusting assembly 70 is affixed to the cantilevered support arm 69 with a rod 71 extending therefrom to make contact with contact pad 72 which is attached to the second end 67 of the yoke 59.

At the first end 66, a cutting blade 73 is held in place by a plate 74. In addition, a clamping member 76 having a pair of flat wing shaped ends 77—77 and downwardly pointed central portion 78 is rotatably mounted, within the rectangular yoke 59, on a pair of pins 79—79. A pair of turn-down screws 86—86 extend through the flat ends 77—77 and into the yoke 59. Biasing springs 87—87 are seated in a depression (not shown) in the yoke 59 and contact the underside of the flat ends 77—77 of the clamping member 76.

A rotatable wheel 88 having a crescent-shaped aperture 89 therein is mounted for rotation on the second pivot pin 58. A removable stop pin 91 extends through the aperture 89 and into an opening (not shown) in the rectangular yoke 59. A first groove 92 about the circumference of the wheel 88 has one end of a wire 93 permanently affixed therein. The wire 93 extends, and is fixedly connected within a second groove 94 in the shaft 23.

Figure 5:
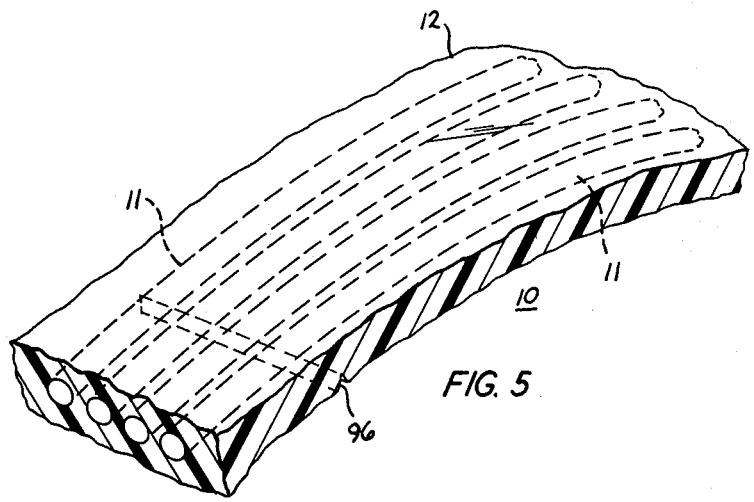
FIG. 5 shows a partial isometric view of an optical fiber ribbon.
Figure 6:
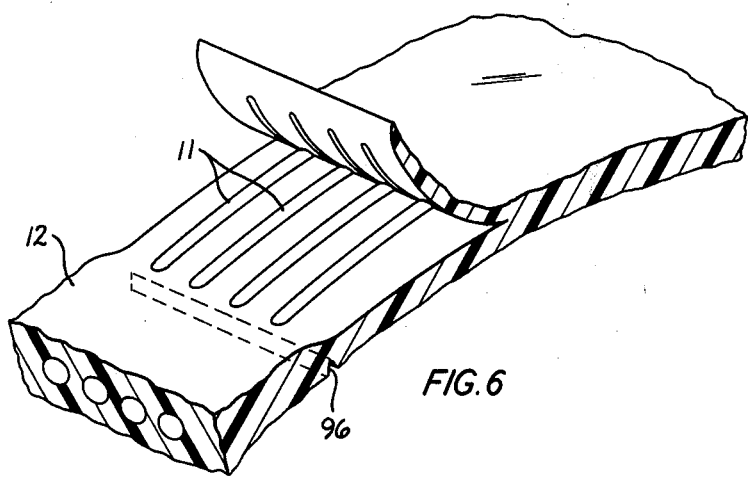
FIG. 6 shows a portion of the protective coating removed from the optical fibers.

In operation, the removable stop pin 91 is removed from the aperture 89, and the knob 25 is rotated in a counter-clockwise direction, as viewed in FIG. 4, until the permanent stop pin 26 contacts the support arm 22. The micrometer assembly 70 is then rotated to urge the second end 67 of the rectangular yoke 59 downward which causes the yoke to pivot on pins 58—58, moving the first end 66 away from the cylindrical stripping wheel 24 (as shown in phantom). The laminated multi-conductor optical fiber ribbon 10b (as shown in FIGS. 2 and 5) to be stripped, is draped over the cylindrical stripping wheel 24, and placed in one of the alignment grooves 28—28 of the ribbon guide member 27 and in corresponding grooves 49 and 51 of the upper end 48 of the support block 47. The ribbon 10 is clamped firmly with the wheel clamp 29 and releasably clamped with the external clamp 52. The cutting blade 73 is lowered toward the stripping wheel 24, under control of the micrometer adjustment assembly 70, until the blade pierces the protective coating 12 of the ribbon 10b. The cylindrical stripping wheel 24 is then rotated to remove or shave away the upper portion of the protective coating 12 (see FIG. 6) as the fibers 11—11 are simultaneously bent to conform with the periphery of the cylindrical stripping wheel.

Figure 7:
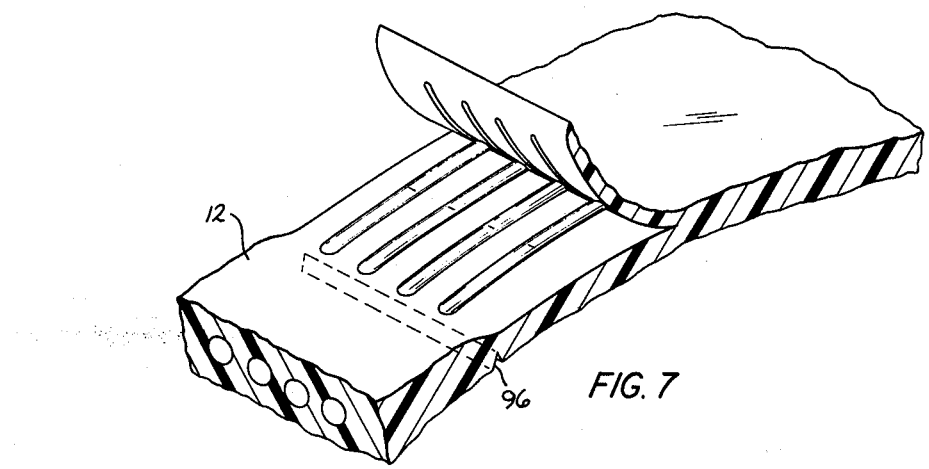
FIG. 7 shows the optical fibers after being scored.
Figure 8:
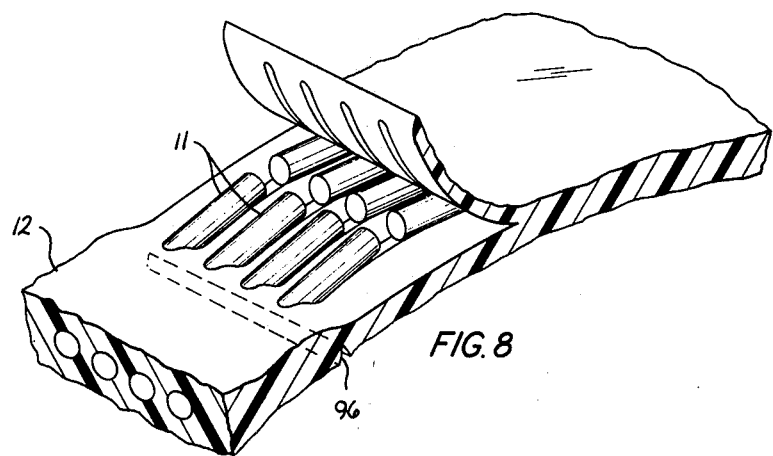
FIG. 8 shows the optical fibers after breaking.

The external clamp 52 is then firmly clamped and the cylindrical stripping wheel 24 is further rotated to put the optical fibers 11—11 in tension. The scoring assembly 34 is then operated by turning the rotatable drive shaft 37 to move the channel member 38 and the diamond tip stylus 40 to traverse the multi-conductor ribbon 10b and lightly score each of the exposed fibers 11—11 (see FIG. 7). The fibers 11—11 normally will break when scribed resulting in optically smooth ends which are perpendicular to the axes of the fibers (see FIG. 8). If any of the fibers 11—11 do not break, additional tension can be applied by rotating the cylindrical stripping wheel 24, until all fibers 11—11 are parted.

Figure 9:
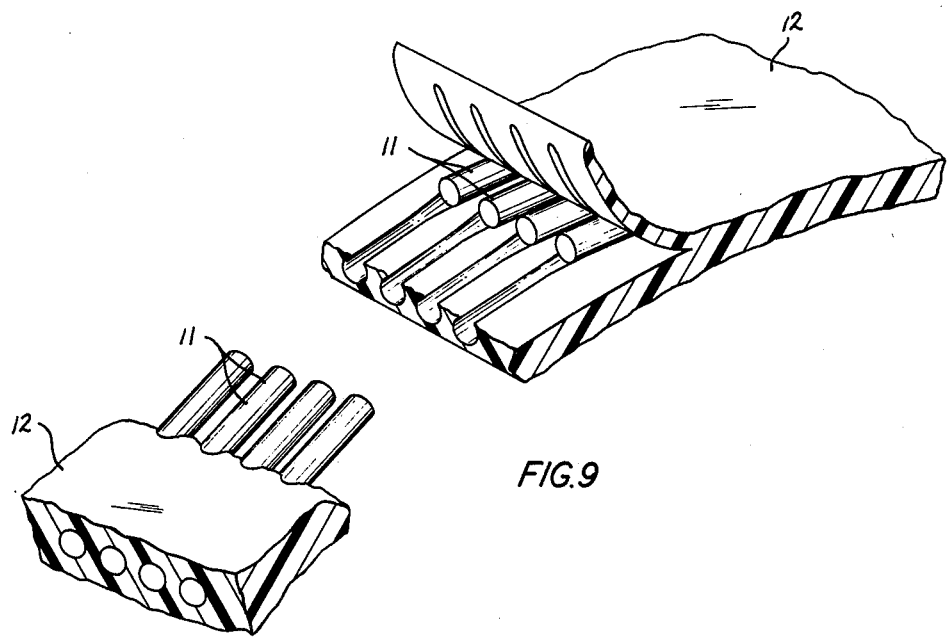
FIG. 9 shows the optical fibers after the protective coating has been severed.

The lower portion of the protective coating may then be severed, resulting in the stripped fibers 11—11 projecting from the protective coating 12 (see FIG. 9) preparatory to insertion into connectors or splicing devices (not shown). The severing of the remaining portion of the protective coating 12 may be accomplished by cutting with a scissors, razor blade or other sharp implement.

Alternatively, a nick 96 may be made across the lower side of the protective coating 12 prior to the stripping operation (see FIG. 5). Then, when the breaking operation is complete, the cylindrical stripping wheel 24 is further rotated which causes the lower portion of the protective coating 12 to part at the nick 96 (see FIG. 9).

The foregoing operation was directed to the stripping of a laminated multi-conductor ribbon 10b as depicted in FIG. 2. However, the stripping of an adhesively bonded multi-conductor ribbon 10a (see FIG. 1) presents an additional problem. The adhesive 13 in the ribbon 10a tends to stick to the cutting blade 73 leaving the fibers 11—11 covered with an undesirable gummy residue.

This problem is overcome by peeling the protective coating 12 from the ribbon 10a. Additionally, the cutting blade 73 is coated with a non-stick, self-lubricating material, such as that sold under the trademark "Teflon" by E. I. DuPont de Nemours. The adhesively bonded multi-conductor ribbon 10a is draped over the cylindrical stripping wheel 24 and placed in one of the grooves 28—28 and the corresponding grooves 49 and 51 of the upper end 48 of the support block 47 as described previously with the laminated ribbon. The removable stop pin 91 is then inserted through the crescent-shaped aperture 89 in wheel 88 into the side of the yoke 59. The cutting blade 73 is brought down onto the ribbon 10a and the protective coating 12 is penetrated and the stripping wheel 24 is rotated until approximately 0.8 cm of coating is shaved away from the ribbon. The shaved portion (the 0.8 cm) moves upward, between the pointed end 78 of the clamping member 76 and the first end 66 of the rectangular yoke 59. The turn-down screws 86—86 are then turned down onto the flat ends 77—77 causing the clamping member 76 to rotate about pins 79—79 and capture the shaved protective coating 12 between the pointed central portion 78 of the clamping member 76 and the first end 66 of the rectangular yoke 59.

The knob 26 is then rotated clockwise which takes up the wire 92 in the second groove 94 in the shaft 23 and causes both the rotatable wheel 88 and the cylindrical stripping wheel 24 to simultaneously rotate in opposite directions. The rotational motion of the wheel 88 is transmitted to the yoke 59 through the stop pin 91, causing the yoke to pivot about the first and second pivot pins 57 and 58, respectively. This causes the first end 66 to swing in an arc (shown in phantom in FIG. 4) away from laminated ribbon 10a and the cylindrical cutting wheel 24 to peel off the protective coating 12 (see FIG. 10). The peeled portion of the protective coating 12 is then cut away and removed. The scribing and breaking operation is then accomplished as hereinbefore described in reference to the stripping of the laminated ribbon 10a.

The stripping apparatus 20 may be fabricated using various types of materials such as metal, wood or plastic which is sturdy and lightweight. A working apparatus has been constructed of aluminum. The micrometer adjusting assembly 70 is a stainless steel micrometer head, Model No. 1463 purchased from the L. S. Starrett Company, Athol, Massachusetts. The scoring assembly 34 is a modified version of an X-Y positioner Model No. 30,058 purchased from the Edmund Scientific Company. The diamond tip stylus 40 is a P ⅛ — 60, 60° phonopoint purchased from the Accurate Diamond Tool Company, 62-T Madison Street, Hackensack, N.J. The cutting blade is a heavy-duty knife blade, No. 1992-5, manufactured by the Stanley Tool Works, Connecticut.

The cylindrical stripping wheel 24 had a diameter of 10 cm which provided a radius of curvature of 5 cm for the bent fibers 11—11 which resulted in clean fiber fractures perpendicular to the axes of the fibers. Fibers 11—11 having diameters of a size different than the 100μm used in the exemplary embodiment would require a cylinder 24 which also has a different diameter to provide the optimum radius of curvature for that specific diameter fiber.

Although the instant embodiment describes the simultaneous bending and removal of a portion of the protective coating 12 of a single ribbon 10, it should be clear that a plurality of ribbons can be simultaneously operated upon using the instant methods and apparatus.

What is claimed is:

1. A method of removing a portion of a protective coating from a planar multi-conductor optical fiber ribbon and breaking the fibers, comprising the steps of:
   a. clamping the ribbon to a section of the periphery of a rotatable cylinder;
   b. additionally clamping the ribbon at a location remote from the rotatable cylinder;
   c. moving a cutting tool, in a controlled manner, to penetrate the coating to a predetermined depth;
   d. rotating the cylinder to simultaneously remove the portion of the protective coating with the cutting tool while longitudinally stressing and exposing the optical fibers and bending the exposed fibers to a predetermined radius of curvature conforming to the periphery of the cylinder; and
   e. scoring the exposed optical fibers to cause them to break.

2. The method of claim 1 wherein the removal of the portion of the protective coating is accomplished by:
   making a precise cut in the protective coating to form an upraised section extending from the protective coating;
   clamping the upraised section with a first clamp spaced from the rotatable cylinder; and
   moving the first clamp away from the ribbon while simultaneously rotating the cylinder to peel the portion of the protective coating from the fibers while bending the fibers to a predetermined radius of curvature about the periphery of the cylinder.

3. Apparatus for removing a portion of a protective coating from a planar multi-conductor optical fiber ribbon and breaking the fibers, comprising:
   a rotatable cylinder;
   a first clamping means mounted on the periphery of the rotatable cylinder to clamp a first section of the ribbon thereto;
   a second clamping means remotely located from the rotatable cylinder to clamp a second section of the ribbon therein;
   a cutting tool located proximate the clamped ribbon to penetrate the protective coating to a predetermined depth;
   means for rotating the cylinder to simultaneously remove the portion of the protective coating with the cutting tool while longitudinally stressing and exposing the optical fibers as the fibers conform to a predetermined radius of curvature about the periphery of the cylinder; and
   means for scoring the exposed fibers to cause them to break.

4. The apparatus as set forth in claim 3 wherein the means for simultaneously removing the coating and bending the fibers comprises:
   a cutting tool to make a precise cut in the protective coating to form an upraised section extending from the protective coating; and
   a third clamping means spaced from the rotatable cylinder, to clamp the upraised section therein, to peel the portion of the protective coating from the ribbon as the clamp is moved away from the ribbon and the rotatable cylinder simultaneously rotates to bend the ribbon to a predetermined radius of curvature about the periphery of the cylinder.

* * * * *